US008849485B2

(12) United States Patent
Christ

(10) Patent No.: US 8,849,485 B2
(45) Date of Patent: Sep. 30, 2014

(54) UTILIZATION OF NAVIGATION INFORMATION FOR INTELLIGENT HYBRID OPERATING STRATEGY

(75) Inventor: Thomas Christ, Auburn Hills, MI (US)

(73) Assignee: Bayerische Motoren Werke Aktiengesellscahft, Munich (DE)

( * ) Notice: Subject to any disclaimer, the term of this patent is extended or adjusted under 35 U.S.C. 154(b) by 1216 days.

(21) Appl. No.: 11/822,558

(22) Filed: Jul. 6, 2007

(65) Prior Publication Data
US 2009/0012664 A1 Jan. 8, 2009

(51) Int. Cl.
| B60L 11/00 | (2006.01) |
| B60L 11/18 | (2006.01) |
| B60L 11/16 | (2006.01) |
| B60L 1/00 | (2006.01) |
| B60W 30/182 | (2012.01) |
| B60L 15/20 | (2006.01) |
| B60L 1/06 | (2006.01) |
| B60W 10/26 | (2006.01) |
| B60W 20/00 | (2006.01) |

(52) U.S. Cl.
CPC ............ *B60W 10/26* (2013.01); *B60L 2250/16* (2013.01); *Y02T 90/16* (2013.01); *B60W 2550/14* (2013.01); *Y02T 10/7027* (2013.01); *B60L 11/1887* (2013.01); *B60L 2240/12* (2013.01); *B60L 11/16* (2013.01); *Y02T 90/34* (2013.01); *Y02T 10/7022* (2013.01); *B60L 1/003* (2013.01); *Y02T 90/161* (2013.01); *B60L 11/005* (2013.01); *B60W 30/182* (2013.01); *B60W 2720/103* (2013.01); *B60L 15/2045* (2013.01); *B60W 2550/20* (2013.01); *B60W 20/00* (2013.01); *B60L 1/06* (2013.01); *B60L 2240/622* (2013.01); *B60L 2240/68* (2013.01); *B60W 2550/402* (2013.01); *Y02T 90/162* (2013.01); *B60W 2510/244* (2013.01)
USPC ..................... 701/22; 180/62.275; 180/62.28; 180/62.285; 180/65.29; 701/414

(58) Field of Classification Search
USPC ........ 180/65.25, 65.8; 701/22, 201, 400–499, 701/500–541; 903/902–960
See application file for complete search history.

(56) References Cited

U.S. PATENT DOCUMENTS

| 5,778,326 | A | * | 7/1998 | Moroto et al. .................. 701/22 |
| 5,790,976 | A | * | 8/1998 | Boll et al. .................. 455/456.5 |
| 5,815,824 | A | * | 9/1998 | Saga et al. ...................... 701/22 |
| 5,911,771 | A | * | 6/1999 | Reichart et al. ................. 701/65 |
| 5,924,406 | A | * | 7/1999 | Kinugasa et al. ............. 123/436 |
| 6,164,400 | A | * | 12/2000 | Jankovic et al. ........... 180/65.25 |
| 6,283,086 | B1 | * | 9/2001 | Yamamoto et al. ....... 123/198 D |
| 6,314,347 | B1 | * | 11/2001 | Kuroda et al. .................. 701/22 |
| 6,561,295 | B1 | * | 5/2003 | Kuroda et al. ............. 180/65.25 |
| 6,886,648 | B1 | * | 5/2005 | Hata et al. ................ 180/65.235 |

(Continued)

FOREIGN PATENT DOCUMENTS

JP          08168105 A * 6/1996

*Primary Examiner* — Stephen Holwerda
(74) *Attorney, Agent, or Firm* — Crowell & Moring LLP

(57) ABSTRACT

A system for operating an hybrid vehicle is described. The system includes an hybrid operating strategy module for controlling hybrid operating functions of the vehicle based on input data, a navigation system providing vehicle routing input data to the hybrid operating strategy module, and a traffic information system providing traffic information input data to the hybrid operating strategy module. The hybrid operating strategy module determines electric portions of the vehicle route for charging batteries of the vehicle and inner portions of the vehicle route for prioritizing electric driving.

17 Claims, 2 Drawing Sheets

(56) References Cited

U.S. PATENT DOCUMENTS

| | | |
|---|---|---|
| 7,539,562 B2 * | 5/2009 | Maguire et al. ................. 701/22 |
| 2003/0006914 A1 * | 1/2003 | Todoriki et al. ............... 340/995 |
| 2003/0015358 A1 * | 1/2003 | Abe et al. ..................... 180/65.3 |
| 2003/0078707 A1 * | 4/2003 | Shioda et al. ................... 701/22 |
| 2008/0029318 A1 * | 2/2008 | Proietty et al. ............... 180/65.2 |

* cited by examiner

UTILIZATION OF NAVIGATION INFORMATION FOR INTELLIGENT HYBRID OPERATING STRATEGY

BACKGROUND OF THE INVENTION

The present invention relates to methods and systems for improving the operating strategy of a hybrid vehicle.

Conventional hybrid vehicles utilize a combination of an electric motor and an internal combustion engine to provide propulsion to the vehicle. Typically, a battery or batteries are provided to power the electric motor, and the internal combustion engine may be used to recharge the batteries, through a generator or alternator.

The charging of the batteries may be controlled using various schemes, such as initiating the recharging procedure when the battery charge falls below a preset value, or when the vehicle is moving at high speed. Other parameters internal to the vehicle may also be considered in determining when to recharge the batteries.

SUMMARY OF THE INVENTION

In one exemplary embodiment, the present invention is directed to a method of operating a hybrid vehicle, including the acts of determining in a navigation system navigation data including a location, a destination and a route of the vehicle, determining in a traffic information system traffic location data along the route of the vehicle, and receiving in a hybrid operating strategy module the navigation data and the traffic location data to predict low speed portions of the route of the vehicle. The method also includes defining in the hybrid operating strategy module electric portions of the vehicle route for charging batteries of the vehicle and inner portions of the vehicle route for prioritizing electric driving. The electric portion may be defined, for example, as a larger radius circle around a point of interest, while the inner portion may be defined, for example, as a smaller radius circle around the point of interest In another aspect, the present invention is directed to a system for operating a hybrid vehicle, including a hybrid operating strategy module for controlling hybrid operating functions of the vehicle based on input data, a navigation system providing vehicle routing input data to the hybrid operating strategy module, and a traffic information system providing traffic information input data to the hybrid operating strategy module. The hybrid operating strategy module determines electric portions of the vehicle route for charging batteries of the vehicle and inner portions of the vehicle route for prioritizing electric driving.

Conventional operating schemes for hybrid vehicles do not consider the need to recharge the batteries based on the vehicle's location. It is thus unlikely that a fully charged battery will be available at times and in locations where it would be beneficial.

Conventional methods of controlling hybrid propulsion systems for vehicles do not take into consideration navigation data generated, for example, by a global positioning system (GPS) receiver, which can provide the vehicle's location as well as its distance from points of interest. That information may be utilized by the intelligent hybrid operating system, according to the invention, to better decide when to use electric propulsion rather than internal combustion propulsion, and to decide when to recharge the batteries.

Armed with information on the location of the vehicle and its routing, the intelligent system is better suited to provide a fully charged battery at times and in locations where it is most needed. The system may, for example, have information enabling a prediction of when the vehicle is about to be parked, so that recharging of the batteries may begin before turning off the vehicle. This procedure may reduce the need to "plug in" the vehicle in a stationary electric source, as the batteries may be nearly recharged by the time the vehicle is parked.

Many hybrid functions such as electric driving (electric propulsion), boosting, preliminary air conditioning and preheating, among others, are carried out using battery power. A high charge condition of the battery is thus necessary for these purposes. However, during normal driving conditions it is not always possible to maintain the preferred high charge state of the batteries. According to the exemplary embodiments of the invention, navigational data and other information is used by the intelligent hybrid operating system to charge the batteries at the appropriate times, so they will be nearly or fully charged when needed.

Utilization of the navigational data also enables the intelligent hybrid operating strategy to make use of Traffic Message Channel (TMC) data, or data from other suitable traffic information providers, which supply information on present traffic conditions, traffic jams and other location-dependent information. Having this data together with knowing the vehicle's location and destination enables the intelligent hybrid operating system to devise a strategy to further predict when a full charge of the battery may be required, and initiate recharging operations accordingly.

Additional information may also be provided by the user to further optimize the strategy of the hybrid operating system. For example, common destinations such as the home and office location which are traveled to and from often may be specified by the user.

The exemplary embodiments of the invention provide for a simple and advantageous utilization of GPS and TMC technologies to derive information to optimize the hybrid operation strategy of the vehicle. When the driver is near home, either departing or arriving, the vehicle propulsion preferably should be predominantly electrical, because it is likely to be operated in a low speed range in a residential neighborhood. It is also highly probable that preliminary tele-air conditioning, defrosting or preheating functions may be used, under battery power, when starting travel from the home. An analogous situation also occurs when starting travel from the workplace.

The intelligent hybrid operating system according to the invention may use an address book in which the driver specifies key locations, such as the "home", the "workplace" and other frequently accessed destinations (generally referred to as destinations or points of interest). These destinations may be used to manage the hybrid vehicle's operation to carry out the measures described above at the right time.

TMC or other traffic information signals may be used by the hybrid operating system, in conjunction with the navigation information, to determine whether to expect a traffic jam along the driving route. In view of this information, the hybrid operating system may provide a strategy to charge the battery before reaching the traffic jam, so that the vehicle is ready to use electric drive in heavy traffic.

The exemplary embodiments of the hybrid operating system also may give special treatment to additional geographic locations or points of interest, where additional intelligent management of the batteries and hybrid components may be beneficial. For example, the special treatment function may be triggered near airports, with the expectation that the vehicle may be parked there for an extended period. As a result, the parking time of the vehicle with sufficient power available to start the engine, and the comfort during subsequent starting and operation may be increased.

The hybrid operating system according to exemplary embodiments may also log or otherwise remember destinations and locations along a route for which the use of electric drive is beneficial, such as areas of low speed. On the other hand, certain destinations may benefit from not activating fully the special treatment function. For example, when the destination is situated very near to an expressway, and the vehicle travels at high speed until reaching that destination.

In one embodiment, the exemplary hybrid operating system uses the environment data of a destination point or other point of interest along the route to generate an "electric radius" around the destination. Within this radius, when the vehicle is heading towards the destination, the intelligent operating strategy is triggered so that the charging of the batteries is increased. The "electric radius" may be defined with respect to time, to location or as a distance to the destination.

Because of the additional charging of the batteries taking place in anticipation of arriving at a destination, the batteries may hold a full or almost full charge when the vehicle stops. As a result, recharging the batteries using a domestic power socket can be for the most part eliminated, because normally the vehicle is parked with batteries in a high charge condition.

A second, smaller radius referred to as the "inner radius" may also be generated by the hybrid operating system around a destination or other point of interest. In the inner radius, the vehicle is operated with electric drive either exclusively or increasingly so, until the destination is reached. Presumably, the region surrounding the destination requires slow speed driving, which is well suited for use of the electric drive.

It will be apparent to those of skill in the art that the regions defined by the "electric radius" and the "inner radius" do not have to be circular. In other embodiments according to the invention, these regions may extend in one or both directions along the route of the vehicle, or may have other shapes, in particular for example, dependent upon road structures in the region.

According to embodiments of the invention, the exemplary navigation system provides to the hybrid operating system data which includes the distance and/or driving time to the destination, and the driving route, among other data. A flag may also be transmitted to the hybrid operating system indicating whether the vehicle is moving towards or away from the point of interest.

After the vehicle has been parked, and the driver starts to travel away from the prior destination, electric driving is increasingly used while within the inner radius. Once outside of the inner radius, the hybrid operating system switches back to the normal operating strategy, with normal use of electric and/or internal combustion drive, and normal charging of the batteries.

Those of skill in the art will understand that additional different types of propulsive systems may be used, according to the invention, in lieu of an internal combustion engine. For example, a turbine or other type of propulsion system able to operate the generators used to recharge the batteries may be used. The internal combustion engine may be fueled by gasoline, diesel fuel, hydrogen, natural gas, or any other suitable type of fuel.

In one exemplary embodiment, a display is provided to the driver showing the status of the hybrid operating system and intelligent operating strategy. For example, the display may show a moving map representation of the vehicle's route, and may show when entering the two defined radii or zones around destination points. The display may also indicate, as an example, that the vehicle knows it is heading home, and is already charging the batteries. By displaying the status of the intelligent operating strategy, the driver may be made more conscious of the hybrid strategy functions, and may be given the impression of operating an intelligent vehicle, which can provide a significant marketing advantage by promoting the high technology aspects of the vehicle compared to competing vehicles. Additionally, the driver may be able to override the hybrid strategy function if known to be desirable.

Additional advantages of the present invention relate to the efficiency of the vehicle utilizing the embodiments of the intelligent hybrid operating strategy. Because of the increased use of electric driving in situations where a low speed of the vehicle is expected, such as near the home or the workplace of the user and in traffic jams, the fuel efficiency is increased and pollution is reduced.

Increased convenience of the vehicle also results from adoption of the embodiments of the invention, because the intelligent hybrid operating strategy increases charging of the batteries of the vehicle in advance of stopping at home or at the workplace, so that recharging using a wall outlet is usually not necessary. As a result, when the driver is ready to depart, the batteries are sufficiently charged to operate pre-heating, pre-air-conditioning, defrosting, internal combustion engine start and other functions which require a large electric charge.

Provisions may be made for making various functions remotely available, such as cooling by air conditioning or heating before leaving the home or the workplace. According to the invention, the batteries would be sufficiently charged to permit these remote functions as well.

Other objects, advantages and novel features of the present invention will become apparent from the following detailed description of the invention when considered in conjunction with the accompanying drawings.

DETAILED DESCRIPTION OF THE DRAWINGS

Figure 1:
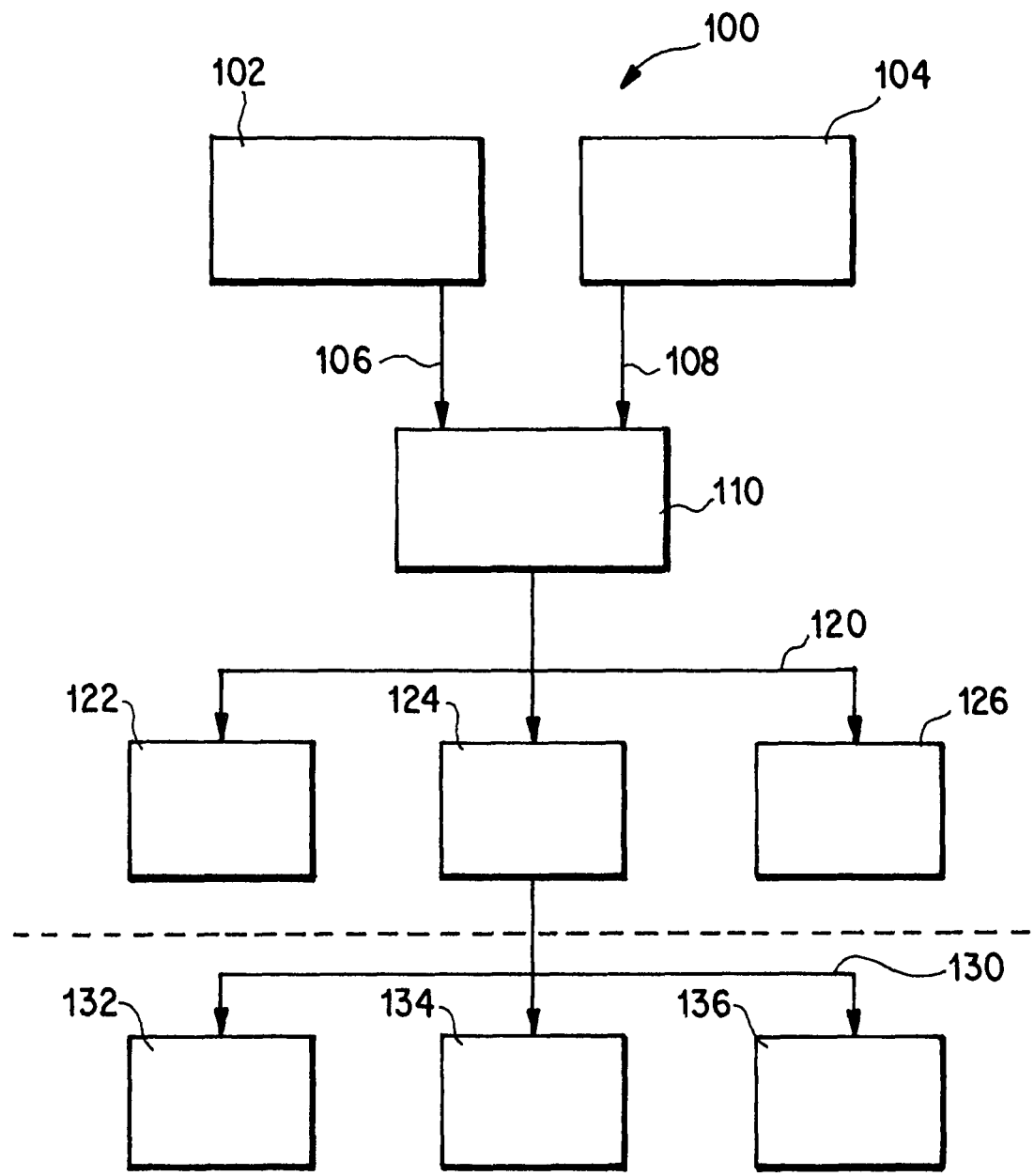
FIG. 1 is a diagram showing a relationship between components of the intelligent hybrid operating system according to an embodiment of the invention.

An exemplary embodiment of a hybrid operating system utilizing the intelligent hybrid operating strategy according to the invention is shown in FIG. 1. The exemplary system 100 includes a navigation system 102, which may be based, for example, on the GPS constellation of satellites, or on other navigation technologies able to provide a present location of the vehicle. A data flow 106 may be exchanged between the navigation system 102 and a hybrid operating strategy module 110. The data may include, for example, information to determine the distance and driving duration of the planned travel, i.e. between the home and the workplace, the departure and destination localities, traffic data, etc. In one exemplary embodiment, the navigation system 102 receives data from GPS satellites from which it computes the vehicle's position, among other information.

Those of skill in the art will understand that the points of interest according to the invention may include other locations. For example, destinations visited often by the driver may be stored in a database, as well as other user defined points in addition to the home and workplace, public facilities like airports, golf courses, public venues and other localities where operating according to the intelligent system of the invention may result in reduced emissions and greater convenience for the user.

A traffic information system 104 is also connected to the hybrid operating strategy module 110. For example, traffic message channel (TMC) data may be received therein, or other services and systems for providing traffic, road condition, weather or any other data useful in planning and evaluating a specific routing may be used. For example, XM NAv Traffic® and MSN® Direct may be used to obtain the desired data via a radio connection. A data flow 108 may be exchanged between the traffic information system 104 and the hybrid operating strategy module 110, containing information regarding traffic conditions, directions to/from the home and the workplace, and other data from the navigation system useful in retrieving the appropriate traffic information. The exemplary traffic information system 104 thus receives data from a suitable traffic information provider, and from that data generates a traffic picture used by the system 100.

The hybrid operating strategy module 110 may include, for example, a processor and memory combination capable of processing the data received from the navigation system 102 and the traffic information system 104, and to take actions based on programmed instructions. The hybrid operating strategy module 110 also provides data to the systems described above, and controls various hybrid functions which operate the hardware of the hybrid vehicle, as will be described in more detail below.

Based on the information received from the navigation and traffic information systems, the hybrid operating strategy module 110 controls hybrid functions 120 of the vehicle, which are further related to the hardware 130. For example, the battery functionality 122 may be controlled in this manner. As described above, when the vehicle is predicted to approach the "electric radius" around a point of interest, the hybrid operating strategy module 110 instructs the battery functionality 122 to increase the charging of the batteries 132, so that a high charge state is provided when the vehicle arrives at the destination, or when electric driving is expected.

Those of skill in the art will understand that the batteries 132 are only one possible type of energy storage device which may be utilized according to the present invention. For example, additional types of energy storage and/or generation devices may include capacitors, such as double layer capacitors, fuel cells, kinetic energy storage devices, chemical energy storage devices, etc.

The hybrid operating strategy module 110 according to one embodiment of the invention generates instructions for the operation of the electric driving functionality 124, which controls the electric machines 134, such as electric motors which provide propulsion of the vehicle. As described above, the electric driving functionality 124 causes the vehicle to be powered electrically within the inner radius described above, when traveling at low speed, in a traffic jam or near the home or workplace of the user.

Another one of the exemplary hybrid functions 120 is the electric air conditioning functionality 126. This functionality is related to the air conditioner 136, and in other embodiments may control pre-heating and defrosting of the vehicle as well. As described above, this functionality may be used to pre-heat or cool the vehicle using battery power, and thus requires a substantially full charge to be effective.

Figure 2:
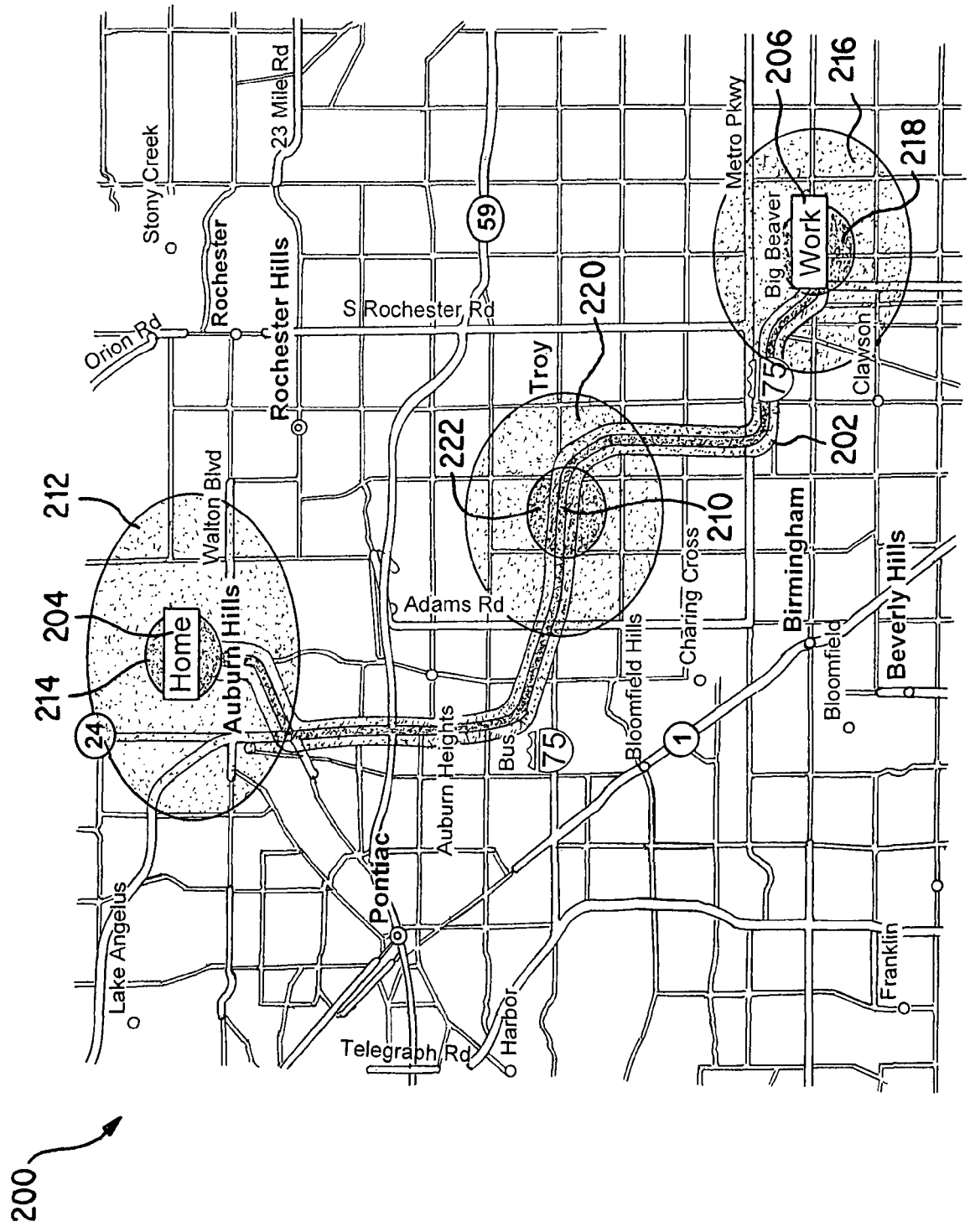
FIG. 2 is a pictorial representation of a navigation display showing the two radii classification according to an embodiment of the invention.

FIG. 2 shows an exemplary representation of a map on a vehicle display depicting a typical commute for which the hybrid operating strategy module 110 is well suited. The exemplary display map 200 shows a typical commute from a home 204 to a workplace 206 via a route 202. A traffic jam 210 may be present somewhere along the route 202. Defined areas may be generated by the hybrid operating strategy module 110 around selected points along the route of travel, to define regions in which particular actions of the intelligent hybrid strategy take place.

In the neighborhood near the home 204, one can expect the last 100 to 500 meters to be driven at low speed, likely around 20 MPH, and to encounter many stop signs and stop lights. At other destinations there may be large parking areas, where the speeds may be less than 10 MPH. In both cases, the driving should be preferably all electrical. On clear portions of the route 202 speeds can be over 40 MPH, causing the internal combustion engine to become active, while electric driving is again used preferentially when the traffic jam is reached.

In one exemplary embodiment, the electric radius 212, 216, 220 may be centered around points of interest such as one of the destinations (Home 204 or workplace 206) and around low speed areas such as traffic jam 210. When approaching these regions, the batteries are charged and the load point is raised, to prepare for the anticipated heavier use of electric power. The inner radius 214, 218, 222 is where the higher electrical demand takes place, for example by prioritizing electric driving, or by requesting pre-heating or pre-cooling from the air conditioning system. This draws down the battery, necessitating the high charge state achieved in the electric radius 212.

In different exemplary embodiments of the invention, the hybrid operating strategy module 110 may learn the generally slow moving portions of a typical commute, and may set the electric and inner radii accordingly. Other common destinations may be pre-loaded in a database or learned, such as airports, golf courses, etc., so that the navigation system 102 can be used to determine location distance input data between the points of interest, and the TMC system 104 can provide traffic input data.

The ability to have charged batteries when the need to operate electrically arises makes the present hybrid operating strategy module 110 well suited to curb emissions and improve the vehicle's efficiency. Using a display system further involves the driver in the operation of the vehicle, and highlights the high technology aspects of the hybrid operating strategy according to the invention, providing desirable promotional opportunities to showcase the technology.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for operating a hybrid vehicle, comprising:
   a navigation system providing vehicle routing input data of the hybrid vehicle corresponding to a vehicle route;
   a traffic information system providing traffic information input data that includes traffic jam information for the vehicle route; and
   a hybrid operating strategy module for controlling hybrid operating functions of the vehicle based on the vehicle routing input data received from the navigation system and the traffic information input data, including the traffic jam information, received from the traffic information system,
   wherein the hybrid operating strategy module determines electric portions of the vehicle route in which to charge an energy storage device of the vehicle, and inner portions of the vehicle route in which to prioritize electric driving, wherein at least one of the inner portions of the vehicle route is defined around a location of a traffic jam determined from the traffic jam information, and wherein, in accordance with the hybrid operating strategy, in the electric portions of the vehicle route, the energy storage devices are charged to meet expected increased charge demands resulting from upcoming traffic conditions at least partly within the inner portions of the vehicle route, as determined from the traffic jam information, including expected increased charge demands resulting from said traffic jam.

2. The system according to claim 1, wherein the vehicle routing input data comprises at least one of vehicle location, destination location and vehicle route.

3. The system according to claim 1, wherein the hybrid operating strategy module defines the inner portions of the vehicle route to be smaller than and within the electric portions thereof.

4. The system according to claim 3, wherein the inner portions and electrical portions are circular.

5. The system according to claim 1, wherein the hybrid operating functions comprise at least one of an energy storage device charging functionality, an electric driving functionality and an air conditioning functionality.

6. The system according to claim 1, further comprising at least one of energy storage devices, electrical machines and an air conditioner controlled by the hybrid operating strategy module.

7. The system according to claim 1, wherein the electric portions and the inner portions are defined, using at least one of the vehicle route input data and the traffic jam information, around each of departure points, destination points and traffic jams along the vehicle route.

8. The system according to claim 1, wherein the inner portions are defined, using the vehicle route input data from the navigation system, about a home and a workplace of a vehicle user.

9. The system according to claim 1, wherein the inner portions and the electric portions are defined by one of a selected time and a selected distance from a point of interest along the vehicle route.

10. The system according to claim 6, wherein, in the inner portions of the vehicle route, the electric motors preferentially provide propulsion to the vehicle.

11. A method of operating a hybrid vehicle, comprising the acts of:

determining in a navigation system navigation data comprising a location, a destination and a route of the vehicle;

receiving, from a traffic information system, traffic location data along the route of the vehicle, wherein the traffic location data includes traffic jam information along the route of the vehicle;

receiving in a hybrid operating strategy module the navigation data and the traffic location data, including the traffic jam information, to predict points of interest along the route of the vehicle;

defining in the hybrid operating strategy module electric portions of the vehicle route for charging an energy storage device of the vehicle and inner portions of the vehicle route for prioritizing electric driving in proximity of the points of interest, wherein at least one of the inner portions of the vehicle route is defined around a location of a traffic jam determined from the traffic jam information; and charging, in the electric portions of the vehicle route and in accordance with the hybrid operating strategy, the energy storage device in order to meet expected increased charge demands resulting from upcoming traffic conditions at least partly in the inner portions of the vehicle route, as determined from the traffic jam information, including expected increased charge demands resulting from said traffic jam.

12. The method according to claim 11, further comprising the acts of defining the inner portions within the electric portions.

13. The method according to claim 11, further comprising instructing an electric drive functionality to preferentially utilize electric propulsion when in the inner portions.

14. The method according to claim 12, further comprising defining, using the vehicle route input data from the navigation system, the inner portions and the electric portions about at least one of a home and a workplace specified by a user of the vehicle.

15. The method according to claim 12, further comprising defining, using the traffic jam information received from the traffic information system, the inner portions and the electric portions about traffic jams along the vehicle route.

16. The method according to claim 11, further comprising depicting the electric portions and the inner portions of the route on a map display.

17. The method according to claim 11, further comprising defining the electric regions and the inner regions by specifying one of a distance to and a time to at least one of said points of interest along the vehicle route.

* * * * *